United States Patent
He et al.

(10) Patent No.: US 8,439,575 B2
(45) Date of Patent: May 14, 2013

(54) CONNECTOR HAVING AN FLOATABLE OPTICAL MODULE

(75) Inventors: Jia-Yong He, Kunshan (CN); Qi-Sheng Zheng, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 266 days.

(21) Appl. No.: 12/909,833

(22) Filed: Oct. 22, 2010

(65) Prior Publication Data

US 2011/0097043 A1 Apr. 28, 2011

(51) Int. Cl.
*G02B 6/36* (2006.01)

(52) U.S. Cl.
USPC .......................................................... 385/53

(58) Field of Classification Search .................. None
See application file for complete search history.

(56) References Cited

U.S. PATENT DOCUMENTS

| 6,290,402 | B1* | 9/2001 | Shishikura et al. | 385/88 |
| 7,717,733 | B1* | 5/2010 | Yi et al. | 439/452 |
| 7,896,559 | B2* | 3/2011 | Yi et al. | 385/75 |
| 8,251,593 | B2* | 8/2012 | Liao et al. | 385/90 |
| 8,256,970 | B2* | 9/2012 | Marrs et al. | 385/81 |
| 2005/0220422 | A1* | 10/2005 | Brief et al. | 385/72 |
| 2010/0278490 | A1* | 11/2010 | Liao et al. | 385/90 |
| 2010/0290745 | A1* | 11/2010 | Liao et al. | 385/90 |
| 2011/0299816 | A1* | 12/2011 | Yen et al. | 385/89 |

FOREIGN PATENT DOCUMENTS

JP 06214139 A * 8/1994
WO WO2008/121731 10/2008

* cited by examiner

*Primary Examiner* — Sung Pak
(74) *Attorney, Agent, or Firm* — Wei Te Chung; Ming Chieh Chang (57) ABSTRACT

A connector (100) includes an insulative housing (1) having a receiving slot (141) formed therein; an optical module (3) for transmitting optical data and being movably received in the receiving slot; a compression coil spring (4) having a first end for biasing the optical module to move in the receiving slot; a metal shell (7) shielding the insulative housing; and a sleeve (40) encircling a second end of the compression coil spring (4) opposite to the first end for retaining the compression coil spring therein.

19 Claims, 8 Drawing Sheets

CONNECTOR HAVING AN FLOATABLE OPTICAL MODULE

BACKGROUND OF THE INVENTION

1. Field of the Invention

The present invention relates to a connector, more particularly to a connector having an optical module for transmitting optical data.

2. Description of Related Art

At present, Universal Serial BUS (USB) is a widely used input/output interface adapted for many electronic devices, such as personal computer and related peripherals. In 1994, Intel, HP, IBM, NEC etc. together founded USB-IF to define a spec of USB. Nowadays, USB-IF has published several editions for USB, and transmitting rate of USB has became higher and higher. As development of electronic industry, higher transmitting rate of USB based connection accessory is needed.

An optical universal serial bus (OUSB) has been disclosed to be adopted for optical data transmission. The OUSB includes a USB connector with a number of lenses embedded in the USB connector and further connected with respective fibers for transmitting optical signal. Therefore, the OUSB can transmit signals up to 10 Gbps. However, as the lens are fixed to the USB connector, and they may fail to mate with counterparts if excessive clearance exits in manufacturing process.

Hence, an improved connector with a floatable optical module is desired to overcome the above problems.

BRIEF SUMMARY OF THE INVENTION

According to one aspect of the present invention, a connector comprises: an insulative housing having a receiving slot formed therein; an optical module for transmitting optical data and being movably received in the receiving slot; a compression coil spring having a first end for biasing the optical module to move in the receiving slot; a metal shell shielding the insulative housing; and a sleeve encircling a second end of the compression coil spring opposite to the first end for retaining the compression coil spring therein.

According to another aspect of the present invention, a connector comprises: an insulative housing having a base portion and a tongue portion extending forwardly from the base portion, the tongue portion having a receiving slot recessed downwardly from an upper surface thereof, and a cavity located behind the receiving slot and forwardly communicating with the receiving slot; an optical module for transmitting optical data and being movably received in the receiving slot along a front-to-back direction; a metal shell shielding the tongue portion and covering the receiving slot and cavity; a sleeve retained in the cavity and sandwiched between the metal shell and the tongue portion in a height direction; and a compression coil spring having a front end forwardly biasing the optical module and a rear end being encircled by the sleeve.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
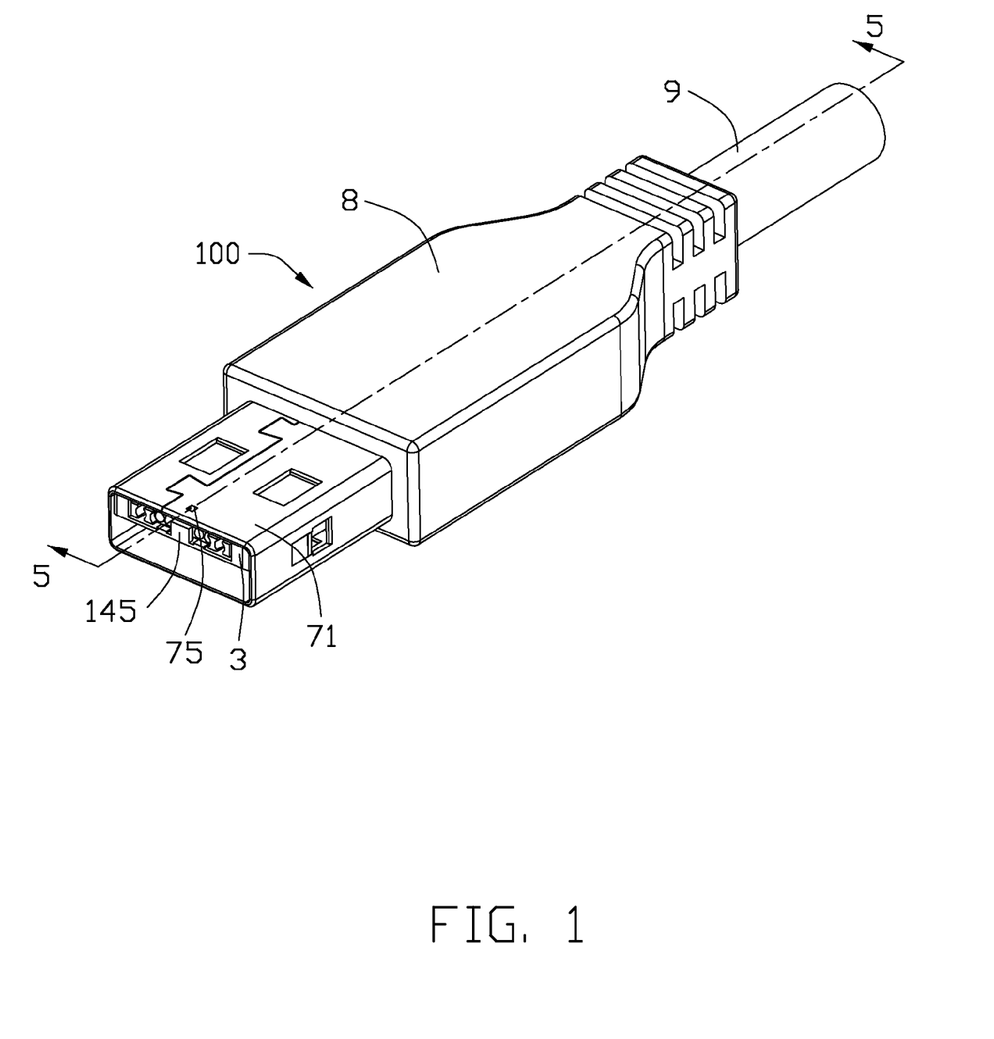
FIG. 1 is an assembled, perspective view of a connector according to a first embodiment of the present invention.
Figure 2:
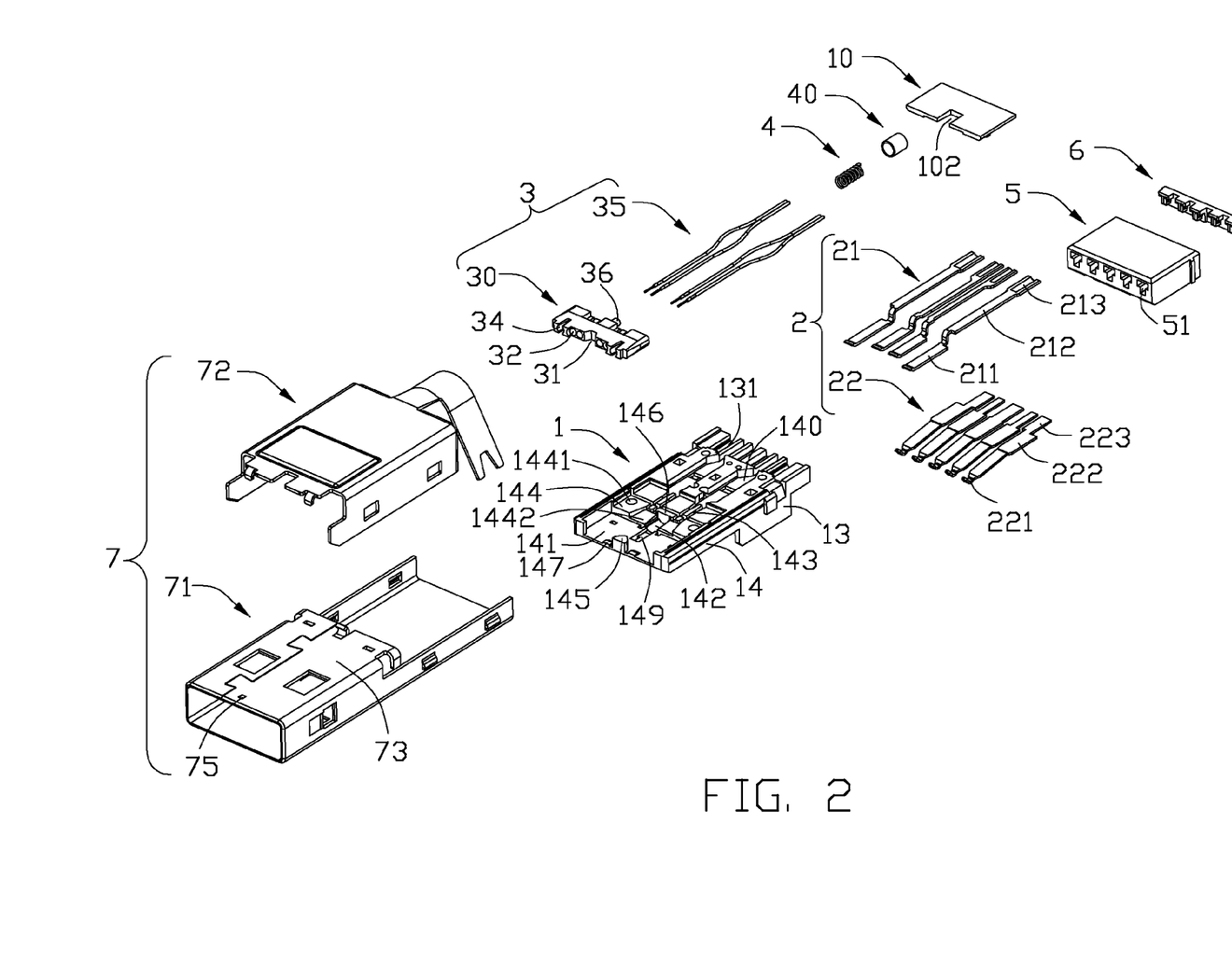
FIG. 2 is an exploded perspective view of the connector shown in FIG. 1.
Figure 3:
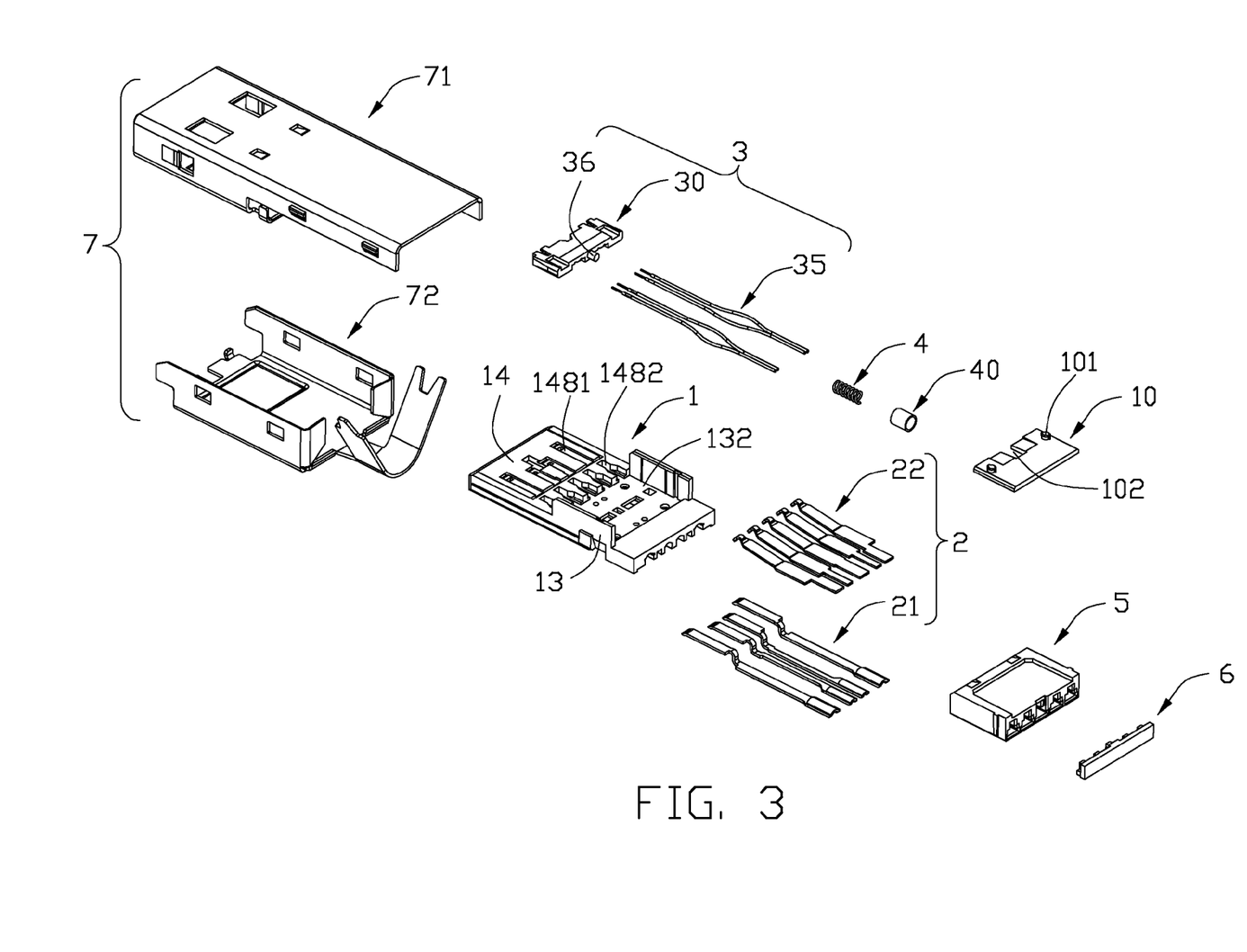
FIG. 3 is similar to FIG. 2, but viewed from another aspect.
Figure 4:
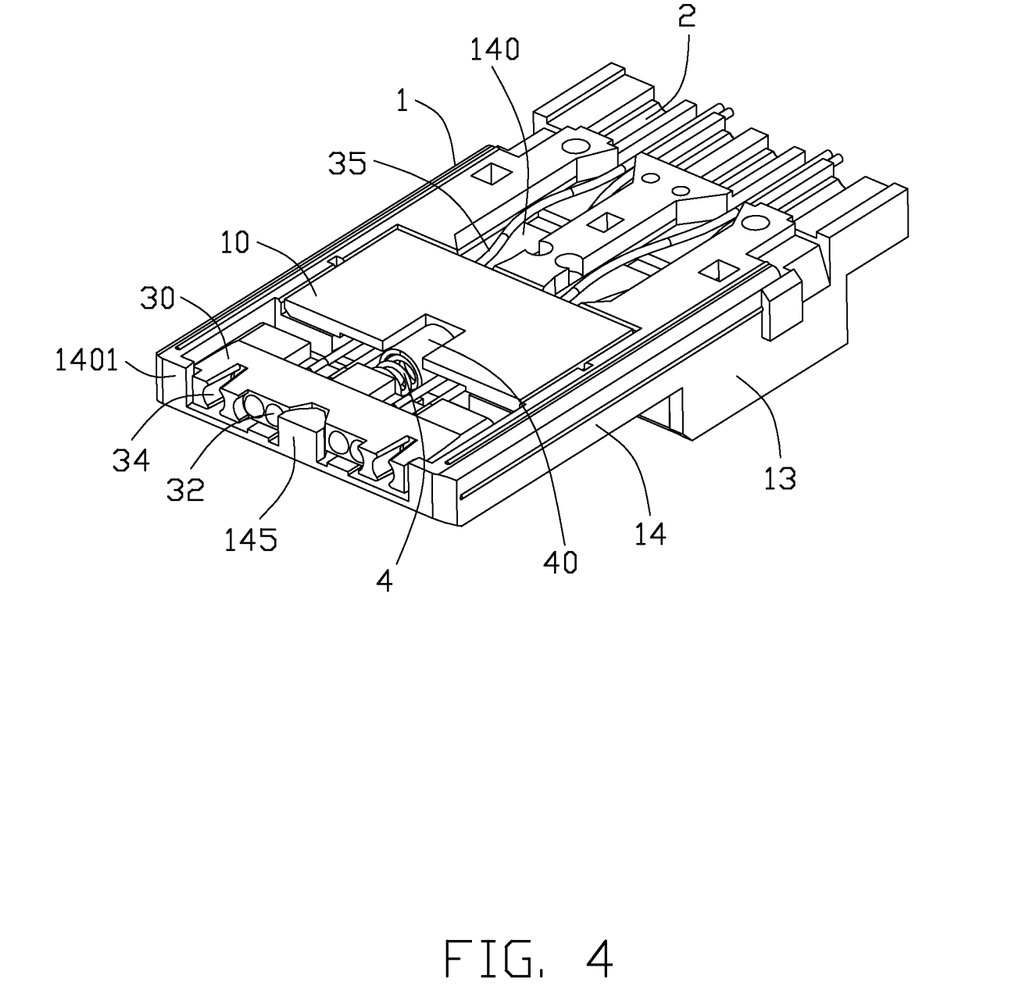
FIG. 4 is a partially assembly view of the connector shown in FIG. 1.
Figure 5:
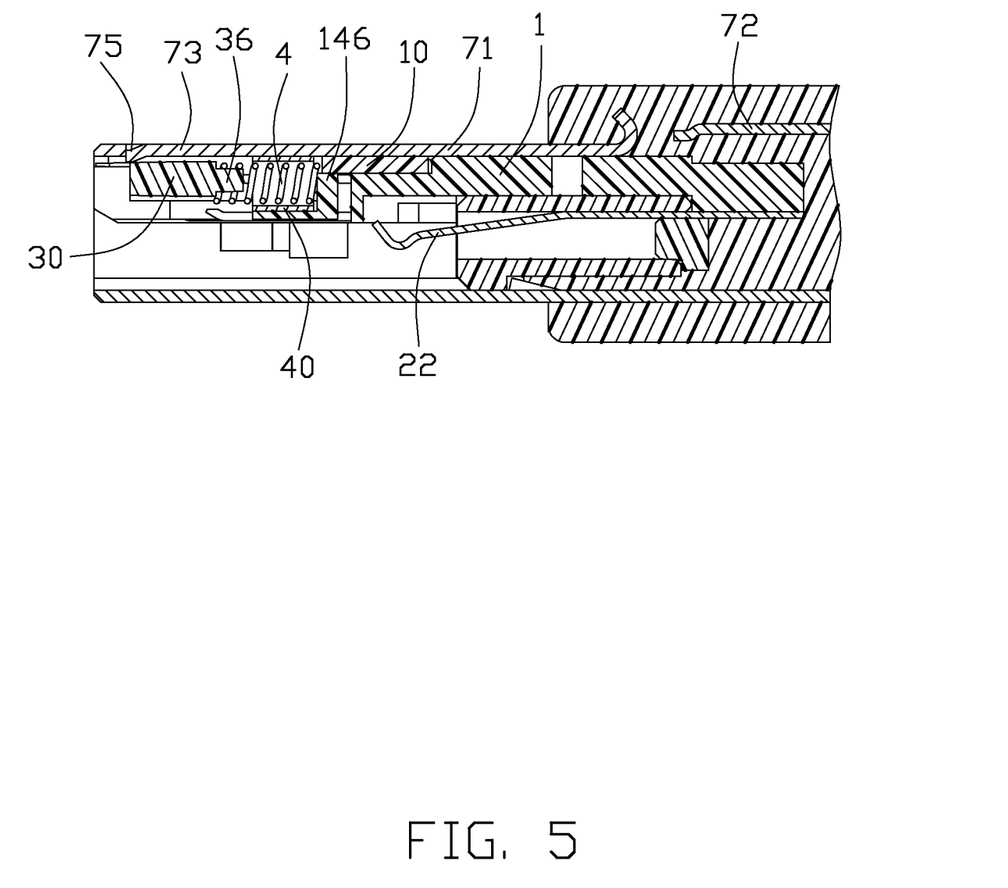
FIG. 5 is a cross-sectional view of the connector taken along line 5-5 shown in FIG. 1.
Figure 6:
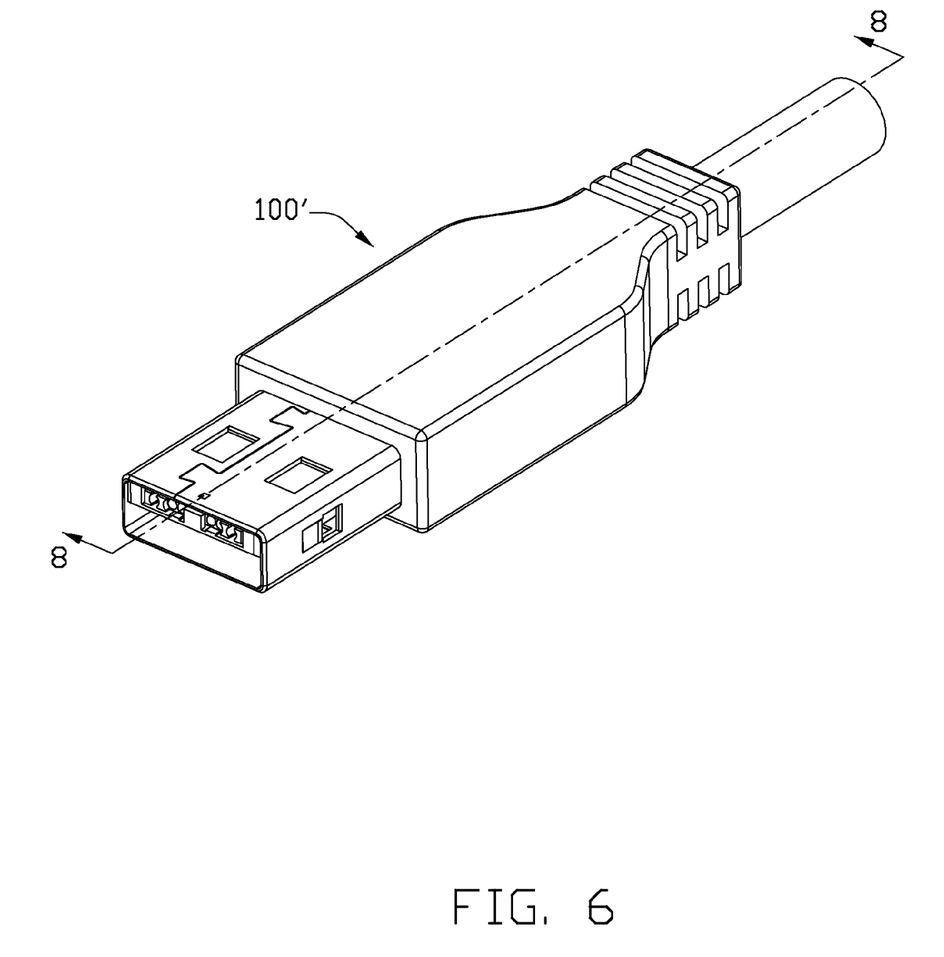
FIG. 6 is an assembled, perspective view of a connector according to a second embodiment of the present invention.
Figure 7:
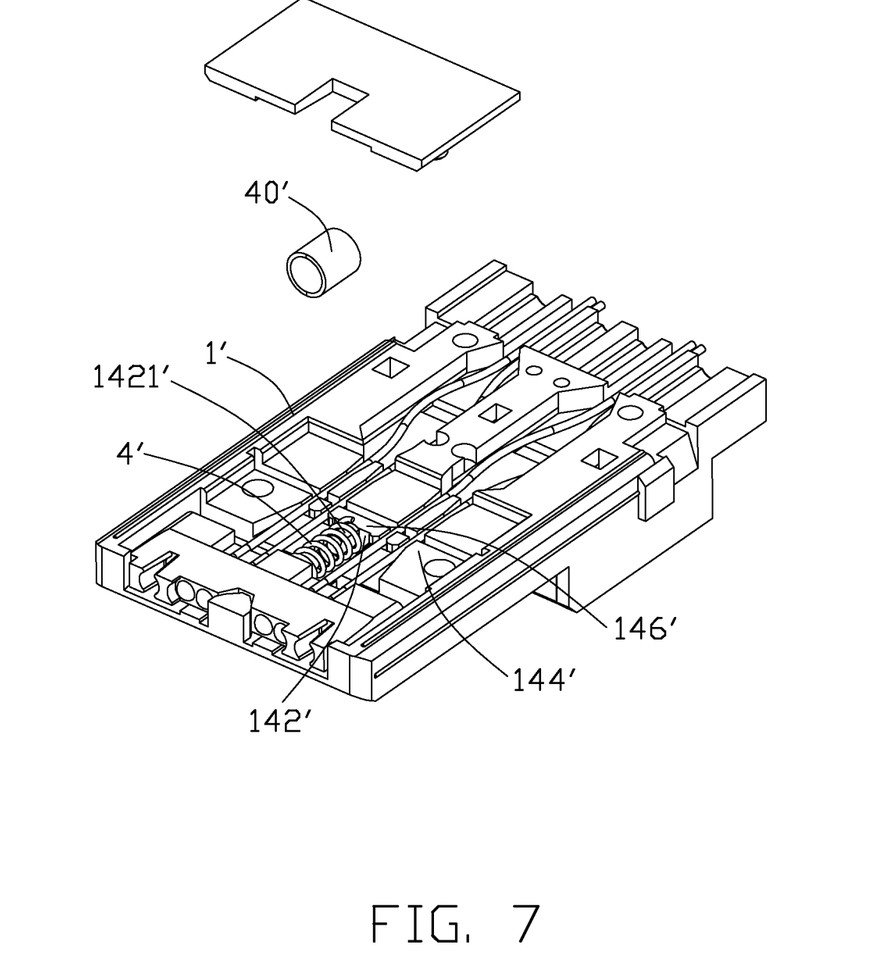
FIG. 7 is a partially exploded view of the connector shown in FIG. 6.
Figure 8:
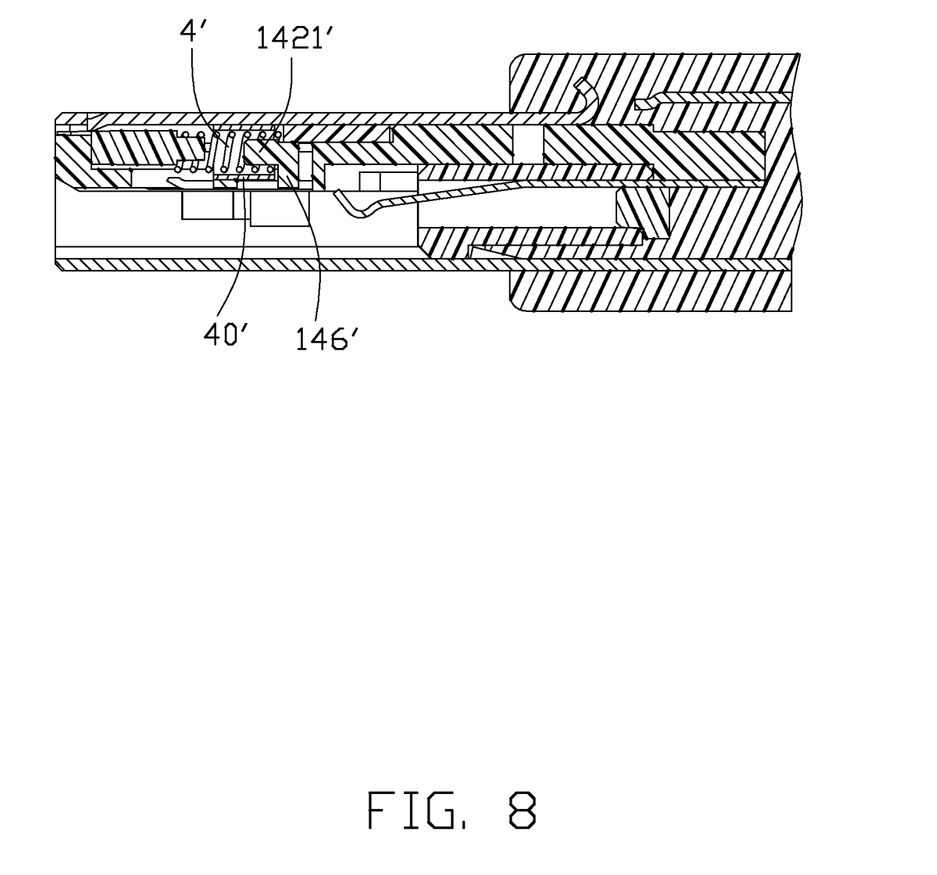
FIG. 8 is a cross-sectional view of the connector taken along line 8-8 shown in FIG. 6.

Referring to FIGS. 1-3, A connector 100 according to the present invention of a first embodiment is a plug of a USB connector cable assembly and comprises an insulative housing 1, a set of contacts 2 attached to the insulative housing 1, an optical module 3 for transmitting optical data and being coupled to the insulative housing 1, a compression coil spring 4 for urging the optical module 3 moving forwardly, a circular sleeve 40 encircling the compression coil spring 4, a spacer 5 retained in the insulative housing 1, an insulator 6 for engaging with the spacer 5, a shell 7 shielding the insulative housing 1, a plastic case 8 surrounding shell 7, and a cable 9 for electrical connection to the contacts 2. The shell 7 includes a first metal shell 71 and a second metal shell 72 coupled to the first metal shell 71.

Referring to FIGS. 1-5, The insulative housing 1 includes a base portion 13 and a tongue portion 14 extending forwardly from a front end of the base portion 13. The base portion 13 has a depression 132 recessed upwardly from a lower surface thereof for retaining the spacer 5 and a set of retaining slots 131 formed on an upper surface for retaining the contacts 2. The tongue portion 14 has a receiving slot 141 recessed downwardly from an upper surface thereof, a recessed portion 144 recessed downwardly from the upper surface and located behind the receiving slot 141. The recessed portion 144 has a first groove 1442 recessed downwardly therefrom and forwardly communicating with the receiving slot 141, a set of narrower second grooves 143 located behind the first groove 1442 and communicating with the first groove 1442, and a cavity 142 recessed downwardly in the first groove 1442 and forwardly communicating with the receiving slot 141 for receiving the compression coil spring 4. The sleeve 40 encircles a rear end of the compression coil spring 4 and is retained in the cavity 142 in a transverse direction. The recessed portion 144 has a resisting wall 146 located behind the cavity 142 and resist the sleeve 40 and the compression coil spring 4 forwardly to prevent the sleeve 40 and the compression coil spring 4 moving backwardly. The tongue portion 14 has a reception groove 149 located under the receiving slot 141 and upwardly communicating with the receiving slot 141. The reception groove 149 is located under a front end of the compression coil spring 4 to provide a space for the compression coil spring 4 vibrating in a height direction of the connector 100. The insulative housing 1 has a pair of third grooves 140 located behind the second grooves 143 and forwardly communicating with the second grooves 143. The third groove 140 is wider than the second groove 143 and narrower than the first groove 1442 in the transverse direction. The tongue portion 14 has a V-shaped first stopping portion 145 located at front and midst of the receiving slot 141, a pair of second stopping portions 1401 located at front and two sides of the receiving slot 141, and a pair of protrusions 147 formed at two lateral sides of the first stopping portion 145 and between the second stopping portions 1401. The V-shaped first stopping portion 145 gradually reduces from a widest front end to a narrowest back end. The protrusion 147 protrudes upwardly into the receiving slot 141. A set of first passageways 1481 and a set of second passageways 1482 are formed at a lower surface of the tongue portion 14 in a condition that the first passageways 1481 are arranged in a front row along the transverse direction and the second passageways 1482 are arranged in a rear row parallel to the front row. The connector 100 further comprises a cover 10 retained in the recessed portion 144. The cover 10 has a pair of cylinders 101 integrally extending therefrom for being retained into a pair of receiving holes 1441 formed on the recessed portion 144, and an opening 102 corresponding to the cavity 142 for receiving the sleeve 40.

Referring to FIGS. 2 to 3, the contacts 2 are adapted for USB 3.0 protocol, and include a number of first contacts 21 and a number of second contacts 22. The first contacts 21 are adapted for USB 2.0 protocol and each includes a stiff first contacting portion 211 retained in the first passageway 1481, a first tail portion 213 for electrical connection to the cable 9, and a first connecting portion 212 connecting the first contacting portion 211 and the first tail portion 213 and being retained in the base portion 11. The second contacts 22 include two pair of differential contacts and a grounding contact located between the two pair of differential contacts. Each second contact 22 includes a resilient second contacting portion 221 received in the second passageway 1482, a second tail portion 223 for electrical connection to the cable 9, and a second connecting portion 222 connecting the second contacting portion 221 and the second tail portion 223 and being retained in a corresponding through hole 51 of the spacer 5. The insulator 6 is retained in the spacer 5 to retain the second contacts 22 in the spacer 5 firmly. In this embodiment, the first contacts 21 are assembled to the insulative housing 1, the second contacts 22 are assembled to the spacer 5 and form as a module so as to be assembled to the insulative housing 1, in other embodiment, the first contacts 21 could be insert molded into the insulative housing 1, the second contacts 22 could be insert molded with the spacer 5 and form as a module so as to be assembled to the insulative housing 1.

Referring to FIGS. 1-5, the optical module 3 comprises a main body 30 being movably received in the receiving slot 141 along a front-to-back direction which is perpendicular to the transverse direction, and a pair of fibers 35 attached to the main body 30 and received in the first, second, and third grooves 1442, 143, 140. The main body 30 has a V-shaped slot 31 recessed backwardly from a front face thereof and fitted in with the V-shaped first stopping portion 145, a set of lenses 32 attached to the main body 30 and located at two lateral sides of the V-shaped slot 31 for optically coupling with the fibers 35, and a pair of retaining holes 34 formed thereon and located at two lateral sides of the lenses 32 for accommodating a pair of columniations on a complementary receptacle so as to align the lenses 32 with lenses on the receptacle and transmit optical data therebetween reliably. A pole 36 protrudes backwardly from the main body 30 so as to be received in a front end of the compression coil spring 4. Therefore, compression coil spring 4 could be retained in the pole 36 firmly and biases the optical module 3 forwardly.

The fibers 35 have front parts received in the first slot 1442, middle parts retained in the second slots 143, and rear parts received in the third slots 140. The middle parts are retained in the second slots 143 firmly along the transverse direction. The first slot and third slots 1442, 140 which are wider than the second slots 143 will offer spaces for distortions of the front and rear parts.

Referring to FIGS. 2-5, the first metal shell 71 has a top wall 73 resisting the sleeve 40 downwardly so as to retain the sleeve 40 into the cavity 142 firmly and defining a projection 75 projecting downwardly therefrom for abutting against the main body 30 downwardly so as to retain the main body 30 into the receiving slot 141 firmly.

When the connector 100 is inserted into the complementary receptacle for mating with the receptacle, the optical module 3 is pushed backwardly by the receptacle and moves backwardly in the receiving slot 141. Because the rear end of the compression coil spring 4 is retained in the sleeve 40, when the lenses 32 and the corresponding lenses on the receptacle are misaligned, the optical module 3 will vibrate in a height direction accompanying with the front end of the compression coil spring so as to make the lenses 32 align with the lenses on the receptacle and transmit optical data therebetween reliably, the reception groove 149 will offer a space for the front end of the compression coil spring 4 vibrating in the height direction. There is no need other components to retain a rear end of the compression coil spring 4. The sleeve 40 could be made of metallic materials and electrically connect the compression coil spring 4 and the top wall 73 of the first metal shell 71, therefore, static electricity created on the compression coil spring 4 could be eliminated via the first metal shell 71. When the connector 100 is extracted out from the complementary receptacle, the optical module 3 is biased forwardly by the compression coil spring 4 and moves forwardly in the receiving slot 141, the V-shaped first stopping portion 145 fits in with the V-shaped slot 31 for resisting the optical module 3 backwardly and sidewardly so as to prevent the optical module 3 moving in the front-to-back and transverse direction, the second stopping portions 1401 abut against the front face of the main body 30 to prevent the optical module 3 moving forwardly, the projection 75 abuts against the main body 30 downwardly and the protrusions 147 abut against the main body 30 upwardly so as to retain the optical module 3 therebetween. Therefore, the first stopping portion 145 and the second stopping portions 1401 present as a stopping device for orientating the optical module 3 in the front-to-back and the transverse direction, the protrusions 147 and the projection 75 present as a resisting device for orientating the optical module 3 in a height direction of the connector 100, the optical module 3 will be orientated on its original position firmly and accurately, and the optical data will be transmitted between the connector and the receptacle reliably.

Referring to FIGS. 6-9, a connector 100' according to a second embodiment of the present invention. The recessed portion 144' of the insulative housing 1' has a post 1421' protruding forwardly from the resisting wall 146' into the cavity 142' for retaining a rear end of the compression coil spring 4'. Therefore, the rear end of the compression coil spring 4' could be retained in both the sleeve 40' and the post 1421'.

In other embodiments, the sleeve 4 could present as other shapes such as triangular shape, rectangular shape, square shape, polygonal shape, etc.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A connector comprising:
   an insulative housing having a receiving slot formed therein;
   an optical module for transmitting optical data and being movably received in the receiving slot;
   a compression coil spring having a first end for biasing the optical module to move in the receiving slot;
   a metal shell shielding the insulative housing; and
   a sleeve encircling a second end of the compression coil spring opposite to the first end for retaining the compression coil spring therein.

2. The connector according to claim 1, wherein the sleeve is made of metallic materials and electrically connect the compression coil spring and the metal shell.

3. The connector according to claim 1, wherein the insulative housing has a cavity located behind the receiving slot and communicating with the receiving slot for receiving the sleeve, the insulative housing has a resisting wall located behind the cavity for resisting the sleeve forwardly.

4. The connector according to claim 3, wherein the metal shell has a top wall covering the receiving slot and cavity for resisting the optical module and sleeve into the receiving slot and cavity respectively.

5. The connector according to claim 3, wherein the insulative housing has a post protruding forwardly from the resisting wall into the sleeve for retaining the second end of the compression coil spring.

6. The connector according to claim 3, wherein the insulative housing has a base portion and a tongue portion extending forwardly from the base portion, the receiving slot is recessed downwardly from an upper surface of the tongue portion, the optical module comprises a main body being movably received in the receiving slot and biased by the spring member, a set of lenses attached to the main body and exposed to exterior, and a set of fibers attached to the main body for optically coupling with the lenses.

7. The connector according to claim 6, wherein the connector further comprises a cover cooperating with the insulative housing for retaining the fibers on the insulative housing, the cover has an opening corresponding to the cavity for retaining the sleeve.

8. The connector according to claim 6, wherein the main body has a pole protruding backwardly therefrom for retaining the first end of the compression coil spring.

9. The connector according to claim 6, wherein the connector further comprises a plurality of contacts retained on a lower surface of the tongue portion for transmitting electrical data.

10. The connector according to claim 6, wherein the tongue portion has a V-shaped first stopping portion formed at front of the receiving slot, the V-shaped first stopping portion gradually reduces from a widest front end to a narrowest back end, the optical module has a V-shaped slot recessed backwardly from a front face thereof for accordantly accommodating the V-shaped first stopping portion.

11. A connector comprising:
    an insulative housing having a base portion and a tongue portion extending forwardly from the base portion, the tongue portion having a receiving slot recessed downwardly from an upper surface thereof, and a cavity located behind the receiving slot and forwardly communicating with the receiving slot;
    an optical module for transmitting optical data and being movably received in the receiving slot along a front-to-back direction;
    a metal shell shielding the tongue portion and covering the receiving slot and cavity;
    a sleeve retained in the cavity and sandwiched between the metal shell and the tongue portion in a height direction; and
    a compression coil spring having a front end forwardly biasing the optical module and a rear end being encircled by the sleeve.

12. The connector according to claim 11, wherein the sleeve is made of metallic materials and electrically connect the compression coil spring and the metal shell.

13. The connector according to claim 11, wherein the insulative housing has a resisting wall located behind the cavity for resisting the compression coil spring and sleeve forwardly.

14. The connector according to claim 11, wherein the connector comprises a plurality of contacts adapted for USB 3.0 protocol and being coupled to a lower surface of the tongue portion.

15. The connector according to claim 11, wherein the sleeve present as circular or rectangular shape.

16. An electrical connector comprising:
    an insulative housing defining an electrical transmission region and an optical transmission region located at different levels;
    a plurality of contacts disposed in the housing with contacting sections located in the electrical transmission region;
    an optical module disposed in a receiving cavity of the housing, said optical module being back and forth moveable along a front-to-back direction; and
    a coil spring located between the optical module and the housing in said front-to-back direction; wherein
    both ends of said coil spring are restrained by means for restricting the coiling from laterally moving.

17. The electrical connector as claimed in claim 16, wherein the optical module at the corresponding end provides thereon a post surrounded by said end.

18. The electrical connector as claimed in claim 16, wherein the housing at the other end is provided with a sleeve surrounding the other end.

19. The electrical connector as claimed in claim 17, wherein the housing at the other end is further provided with a post surrounded by said other end.

* * * * *